United States Patent [19]
Zicaro et al.

[11] 3,876,309
[45] Apr. 8, 1975

[54] AUTOMATICALLY ADJUSTABLE LASER BEAM POSITIONING APPARATUS

[76] Inventors: Joseph P. Zicaro, 14632 Mimosa Ln., Tustin, Calif. 92680; Ronald G. Kraus, 1715 Liberty Ave., Akron, Ohio 44313; Jerry F. Fraleigh, 5149 Fawn Dr., Akron, Ohio 44319

[22] Filed: Oct. 1, 1973

[21] Appl. No.: 402,623

[52] U.S. Cl. ............ 356/153; 356/138; 331/DIG. 1; 33/366
[51] Int. Cl. ............................................ G01b 11/26
[58] Field of Search ........... 356/138, 153, 172, 248; 33/366; 331/94.5 A

[56] References Cited
UNITED STATES PATENTS

| | | | |
|---|---|---|---|
| 3,409,993 | 11/1968 | Hansen | 33/366 |
| 3,551,057 | 12/1970 | Hamilton et al. | 356/172 |
| 3,580,687 | 5/1971 | Hansen | 356/248 |
| 3,603,691 | 9/1971 | Hamilton | 356/172 X |
| 3,799,674 | 3/1974 | Guillet | 356/138 |

*Primary Examiner*—Ronald L. Wibert
*Assistant Examiner*—Paul K. Godwin
*Attorney, Agent, or Firm*—Oldham & Oldham Co.

[57] ABSTRACT

Disclosed is a laser beam positioning apparatus which may be used to automatically direct and maintain a laser beam at a preselected angle of inclination or declination. The invention fundamentally comprises a pivotally mounted laser beam source or other collimated light source which is operatively connected to a servo motor. A control circuit connected to the servo motor controls the pivotal movement of the light beam source in accordance with the aggregate of two input signals thereto. A first input signal is received from an inclinometer which is operatively attached to the light beam source; the output of the inclinometer being indicative of the degree of alignment or misalignment of the same with the horizon. A second input signal is provided from an operator controlled grade selection circuit. The application of these two input signals to the control circuit causes the servo motor to pivotally adjust the positional relationship of the light beam source with respect to the horizontal until the output of the inclinometer indicates that the light beam source is inclined at that grade preselected by the operator. This angle or grade is then maintained by means of the servo motor under the control of the control circuit.

15 Claims, 5 Drawing Figures

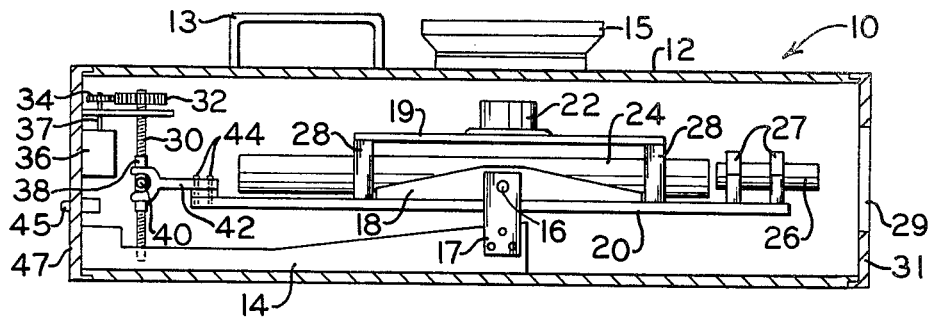
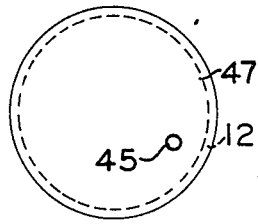
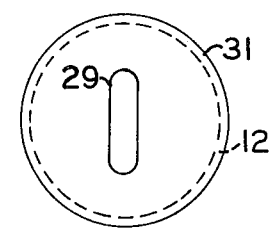
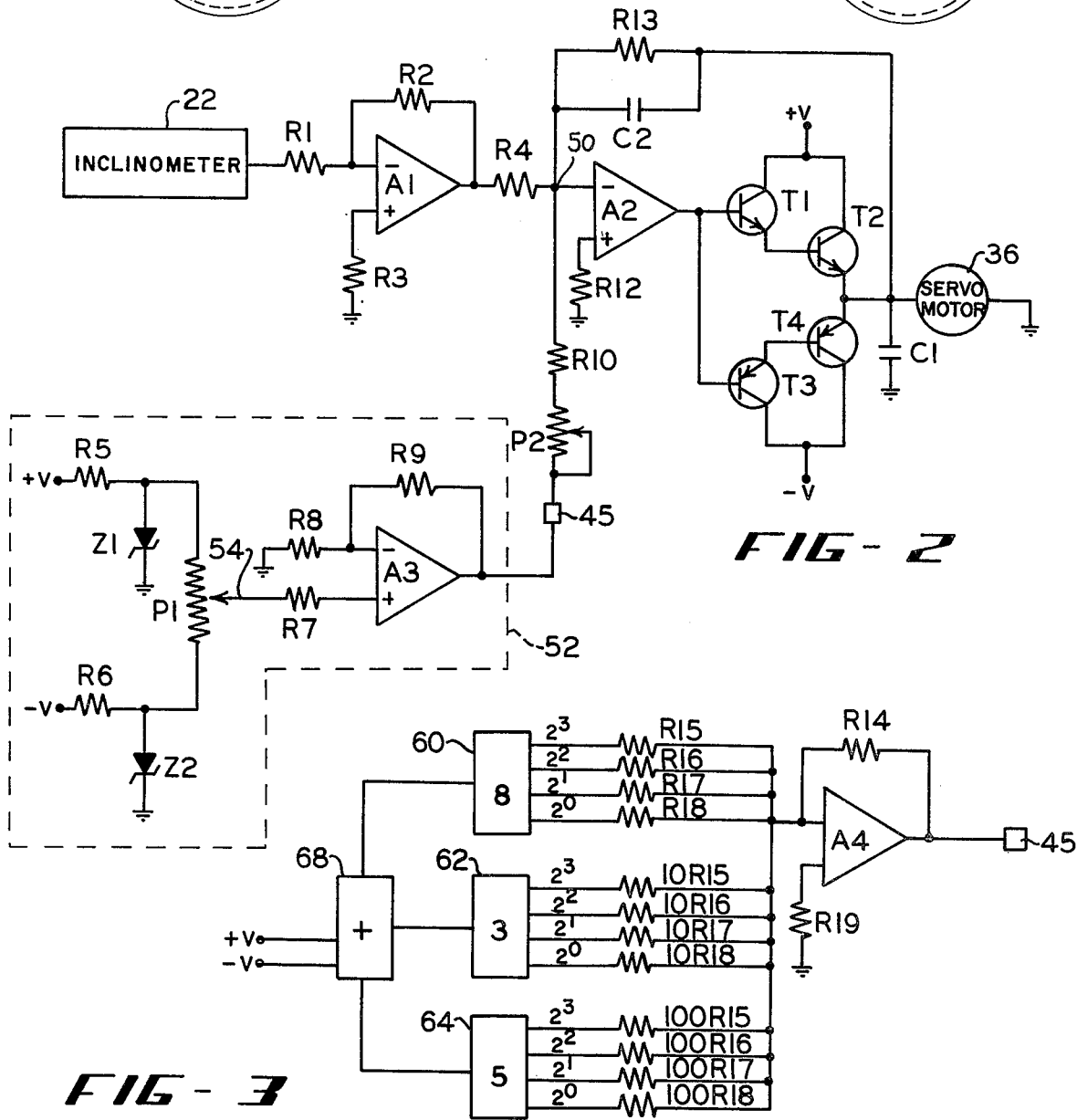

AUTOMATICALLY ADJUSTABLE LASER BEAM POSITIONING APPARATUS

BACKGROUND OF THE INVENTION

Heretofore various types of laser beam positioning apparatus have been known in the art. It has been found with these types of apparatus that alignments and grade determinations may be made with great accuracy. Certain of the instruments currently used in the art utililize laser beams levelled in a manner which requires the repeated adjustment of adjusting screws to establish and maintain the desired alignment. There are further known in the art certain instruments which utilize pendulously supported mirrors or prisms to automatically maintain the direction of the beam. Such an apparatus is described in U.S. Pat. No. 3,729,266 and is known to be extremely delicate and sensitive to misalignment and problems which occur from jarring or handling.

Consequently, it is an object of the instant invention to present a laser beam positioning apparatus which does not require the repeated adjustment of adjusting screws to achieve proper beam alignment.

It is a further object of the invention to present a laser beam positioning apparatus which is sturdy in construction and not dependent upon pendulously supported mirrors or reflectors to achieve proper beam alignment.

Another object of the invention is to present a laser beam positioning apparatus which is automatically adjusted or aligned in accordance with a preselected grade designated by the operator.

Yet another object of the invention is to present a laser beam positioning apparatus which may be remotely controlled by the operator thereof.

Still another object of the invention is to present a laser beam positioning apparatus which is rugged in construction, accurate in operation, automatic in adjustment, and inexpensive to construct.

These objects and other objects which will become apparent as the detailed description proceeds are achieved by apparatus for projecting and maintaining a light beam in a controllable manner, comprising a laser tube pivotally mounted within a housing and projecting a beam therefrom; an inclinometer fixedly connected to the tube and producing an output signal corresponding to the alignment of the tube with the horizon; first circuit means for producing an electrical signal indicative of a desired angle of projection; and, a second circuit means interconnecting the laser tube, inclinometer, and first circuit means for pivotally adjusting the positional relationship of the laser tube with the horizontal.

For an appreciation of the structure and techniques of the invention reference should be had to the following detailed description and accompanying drawing wherein:

FIG. 1 is a cross sectional side view of the mechanical structure of the invention;

FIG. 1a is a right end view of the apparatus shown in FIG. 1;

FIG. 1b is a left end view of the apparatus shown in FIG. 1;

FIG. 2 is a schematic diagram of the circuitry of the invention; and

FIG. 3 is a schematic diagram of an inclination selection circuit or remote control circuit adaptable for use in place of a portion of the circuit shown in FIG. 2.

DESCRIPTION OF MECHANICAL STRUCTURE AND OPERATION

Referring now to the drawings and more particularly FIG. 1, it can be seen that the laser beam positioning apparatus of the instant invention is designated generally by the numeral 10 and comprises a casing 12 which encompasses and encloses the operative structure thereof. A handle 13 may be fixedly attached to the top of the casing 12 to facilitate handling and an attaching mechanism 15 may also be connected thereto as a means for suspending the apparatus 10 from a tripod in the normal manner. At the bottom of the casing 12 there is fixedly attached a base bracket 14 extending longitudinally therealong. A vertical bracket 17 is fixedly connected to the base bracket 14 at one end thereof, the vertical bracket 17 being connected to a platform bracket 18 by means of a pivotal pin 16. The brackets 14, 17 and 18 and the pivotal pin 16 may be of any suitable nature to achieve the purposes which will become apparent hereinafter.

A platform 20, which may be a rectangular metal plate, is fixedly attached to the platform bracket 18 and has attached thereto, by means of mounting clamps 28, a laser tube or other collimated light source 24. Further connected to the platform 20 by means of mounting clamps 27 is a beam expander 26 which functions in the normal manner by expanding the diameter of the laser beam from the tube 24 while correspondingly arresting the divergence thereof. The laser beam passing from the tube 24 through the expander 26 passes through the vertical slit 29 of the end plate 31 as shown in FIG. 1a.

Fixedly connected to the tops of the mounting clamps 28 in parallel relation with the laser tube 24 is a top platform 19 having an inclinometer 22 fixedly attached thereto. The inclinometer 22 may be of any suitable nature. As is well known to those skilled in the art, the inclinometer 22 produces a DC output signal directly proportional to the sine of the angle of inclination or declination which the inclinometer 22 bears with the horizontal. A polarity is associated with the DC level, the polarity indicating whether the inclinometer 22 is at an angle of inclination or an angle of declination. With the inclinometer 22 being mounted atop the platform 19 which is in fixed parallel relation with the tube 24, it should be readily apparent that the output of the inclinometer 22 will be directly related to the angle of inclination or declination of the laser beam passing through the vertical slit 29.

A threaded vertical rod 30 is positioned within the casing 12 and rotatably attached to the bottom thereof at a point behind the laser tube 24. The threaded rod 30 has fixedly attached thereto at the top thereof a gear 32 which mates with a mating gear 34 which is rotatably attached to the shaft 37 of a servo motor 36.

A threaded sleeve 38 is movably threaded upon the vertical rod 30 and has support arms 40 perpendicularly protruding therefrom. A horizontal beam member 42 rests in movable relation upon the support arms 40 at one end and is connected to the platform 20 by means of mounting screws 44 at the other as shown.

As will be described in more detail hereinafter, a control box is connected to the connector 45 of the left end plate 47 as shown in FIG. 1a. The control box allows a remote operator to preselect any given angle of inclination or declination for the projection of the laser beam. The output of the control box and the output of the inclinometer 22 are fed to a control circuit which controls the degree and direction of rotation of the shaft 37 of the servo motor 36. As the motor 36 rotates the interengagement of the gears 32, 34 causes the threaded rod 30 to similarly rotate thus raising or lowering the threaded sleeve 38, depending upon the direction of rotation thereof. As the threaded sleeve 38 is raised or lowered upon the rod 30, the platform 20, operatively connected to the sleeve 38 by means of the member 42, is pivotally angled about the pivotal pin 16 thus resulting in a corresponding degree of inclination or declination of the beam cast from the tube 24 through the expander 26. Thus it should be appreciated that in normal operation with the assembly 10 suspended from a standard tripod or positioned on a base plate the outputs of the inclinometer 22 and the control box will activate the servo motor 36 in such a manner as to angle the beam through the vertical slit 29 in accordance with the preselected angle of inclination or declination.

DETAILED DESCRIPTION OF THE CIRCUITRY

Referring now to FIG. 2, the basic circuitry required for the operation of the invention may be seen. As mentioned hereinabove, the output of the inclinometer 22 is a positive or negative DC level proportional to the sine of the angle of inclination of the inclinometer unit. This output is applied to the inverting input of the amplifier A1 through the resistor R1, the positive input being tied to ground through the resistor R3. A feedback resistor R2 is provided so as to give the buffer amplifier A1 the desired gain. Effectively then there is applied to a summing point 50 through the resistor R4 an amplified voltage signal corresponding to the sine of the angle of inclination or declination of the inclinometer 22.

The control box 52, enclosed by the dotted lines, also produces an output which feeds to the summing point 50. As can be seen, a control box 52 houses a voltage divider circuit interconnected between the DC levels +V and −V, the divider comprising the resistances R5, R6, and P1 with the clamping zener diodes Z1 and Z2 connected across the potentiometer P1. The voltage evidenced on the wiper arm 54 of the potentiometer P1 is passed through the input resistor R7 to the non-inverting input of the amplifier A3. The inverting input of the amplifier A3 is tied to the feedback resistor R9 and to ground through the resistor R8.

The potentiometer P1 is calibrated, for instance in grades, so that an operator may adjust the wiper arm 54 to a point corresponding to a preselected grade such that an output would be evidenced from the amplifier A3 corresponding to the grade selected. This signal is passed from the control box 52 to the connector 45 and through the potentiometer P2 and resistor R10 to the summing point 50. It should of course be realized that a grade is nothing more than the tangent of the angle of inclination or declination. Consequently, there is applied to the summing point 50 from the amplifier A3 a signal corresponding to this angle. Since, for most angles encountered in road grade selection and other surveying functions, the grades or angles of inclination and declination are small (less than 4°), the sine and tangent are, for all practical purposes, identical. Consequently, there is applied to the summing point 50 a first signal from the inclinometer corresponding to the sine of the actual angle of inclination of declination of the laser beam and there is applied a signal from the control box 52 corresponding to the sine of the desired angle. If the signals from the two respective sources are complementary, there will be a null at the summing point 50 when the actual angle equals the desired angle. In other words, the amplifiers A1 and A3 will be connected such that an incline will result in a positive output from one and a negative output from the other while a decline will result in a negative output from the one and a positive output from the other respectively.

There is then presented at the summing point 50 a signal indicative of the error existing between the actual angle and the desired or selected angle. This signal is applied to the negative input of the amplifier A2; the non-inverting input thereof being tied to ground through the resistor R12. The output of the amplifier A2 is connected to and actuates the complementary Darlington circuits respectively comprising the NPN transistors T1 and T2 and the PNP transistors T3 and T4. Positive and negative DC voltage supplies, +V and −V, are interconnected across the complementary Darlington circuits and the servo motor 36 is interconnected between ground and the emitters of the transistors T2 and T4. Thus it can be seen that a positive or negative output from the amplifier A2 will tend to actuate one or the other of the Darlington circuits; the circuit T1, T2 supplying a positive current through the servo motor 36 to ground the Darlington circuit T3, T4 draining current from ground through the servo motor 36 to −V supply. Thus, the direction of rotation of the servo motor 36 is dependent upon the polarity of the output of the amplifier A2 and consequently the relative polarities of the outputs of the inclinometer 22 and the control box 52. The servo motor 36 will rotate in a manner described hereinabove until such point that a null is reached at the summing point 50 resulting in the gating off of both Darlington circuits. When a new or different grade is selected by means of the potentiometer P1 the resultant signal at the summing amplifier 50 will actuate one of the Darlington circuits such that the motor 36 will again bring the laser beam into the desired angle of projection.

It should be briefly noted that a capacitor C1 is interposed across the servo motor 36 for purposes of suppressing transients. A feedback loop for the amplifier A2 is provided by the resistor R13 and the capacitor C2. The transistor R13 is chosen to supply a high enough gain to the amplifier A2 to provide sufficient drive to the Darlington circuits to operate the motor 36. The capacitor C2 is chosen to be of such size as to properly dampen the movement of the servo motor 36 and prevent oscillation of the laser beam about the desired grade. A person skilled in the art may readily select the capacitor C2 which will allow the servo motor 36 to bring the laser beam into the preselected alignment in a rapid manner without overdamping or underdamping the operation thereof.

As was mentioned hereinabove, potentiometer P1 may be calibrated in grades which, for small angles, are equivalent to the sine function of the angles being dealt with. However, when angles of a magnitude greater than 5° are dealt with then it would be expedient for utilization of the invention to provide the operator with a conversion table by which he may convert tangent or grade functions to sine functions and thus select the appropriate sine function by means of the potentiometer P1. This conversion table is but a nicety and is certainly not required for achieving the objects of the invention. It is only important to the teachings of the invention that the selection means, the potentiometer P1, be calibrated in some useable manner.

It is possible that the inclinometer 22 or the platform 19 may not be perfectly parallel to the tube 24. To compensate for any possible error in alignment, a potentiometer P2 has been interposed between the output of the control box 52 and the summing point 50. With the potentiometer P1 is set to a position of zero grade, the laser beam cast through the vertical slit 29 may be directed toward a reference point some distance away which itself is at a zero grade with respect to the unit 10. The potentiometer P2 may then be adjusted to that point at which the beam cast from the tube 24 falls directly upon the reference point. At this time the interrelationship between the inclinometer 22 and the control box 52 has been adjusted by means of the bias of the potentiometer P2 such that the aggregate of the outputs of the inclinometer 22 and the control box 52 will result in a null at the summing point 50. Since the amplifiers A1 and Az have linear gain characteristics, the adjustment of the potentiometer P2 at the zero grade reference level will guarantee a proper and accurate interrelationship between the two amplifiers for all grade levels.

It is preferable, though not required, that means be interposed with the circuit of FIG. 2 to shut off the servo motor 36 if a grade or angle is selected by the control box 52 which is greater than that which is achievable by means of movement of the sleeve 38 upon the rod 30. This object may be readily achieved by connecting to the output of the amplifier A1 a pair of amplifiers (not shown), one being operative to turn off the servo motor 36 when the output of the amplifier A1 reaches a predetermined positive DC level and one operative to turn off the motor 36 when the output drops below a particular negative DC level. In other words, the amplifiers will be utilized merely as voltage comparators and could be connected to transistors or other switching circuit means to remove power from application to the motor 36. Such a turn off circuit should be readily conceivable by one skilled in the art.

It is further contemplated that limit switches might be connected to each end of the threaded rod 30 such that travel of the threaded sleeve 38 to either end of the rod 30 would actuate the limit switches and inhibit the application of power to the motor 36. Such mechanically actuated limit switches are well known in the art and readily adaptable for the use of preventing the attempted angling of the laser beam beyond an obtainable limit.

The control box 52 as shown in FIG. 2 could readily be replaced by the circuitry shown in FIG. 3. Here it can be seen that a plurality of thumb wheel dial selector switches 60, 62, 64 having binary coded decimal outputs may be utilized in place of the calibrated potentiometer P1 as shown in FIG. 2. EAch of the selector switches 60 – 64 have binary coded decimal outputs, $2^0, 2^1, 2^2$ and $2^3$. Each of the binary coded decimal outputs is connected to a resistor, the value of which is weighted inversely to the weight of the output. For example, the resistors R15 – R18, could respectively have the values of 2K, 4K, 8K and 16K. If the selector switch 60 represents the units position for grade selection and the switches 62 and 64 respectively represent the 10th's and 100th's position of the grade selection then, as shown, the resistances respectively connected to the outputs of these switches will be ten and one hundred times the values of the resistances tied to the corresponding outputs of the switch 60. All of the resistors are tied to a common summing point 66 of the summing amplifier A4. As is shown in FIG. 3, the selector switches have been dialed so as to direct a light beam along a grade of 8.35; a rise of 8.35 feet in a lineal distance of one hundred feet. In this case, the selector switch 60 connects the resistor R15 to a voltage, the switch 62 connects the resistors 10R17 and 10R18 to the same voltage, and the switch 64 connects the resistances 100R16 and 100R18 to the same voltage. As it can be seen, the connections are made according to the binary equivalent of the decimal values selected by the respective switches. The weighted values of the resistors result in a voltage at the summing point 66 corresponding to the grades selected. Consequently, the output of the summing amplifier A4, having an appropriate feedback resistor R14 connected thereto, will also be indicative of the grade selected and will be applied as hereinbefore to the connector 45. Of course, the other input of the amplifier A4 is grounded through a resistor R19.

It should also be noted that a selector switch 68 is provided in connection with the switches 60–64 whereby the sign of the grade may be selected. By appropriately selecting a positive or negative sign with the switch 68, respectively indicating an angle of inclination or declination, the appropriate voltage will be applied to the switches 60–64 and consequently the resistance ladder R15 — 100R18. Hence, the switch 68 determines the polarity of the output of the amplifier A4 and consequently the direction of operation of the motor 36.

It is further contemplated that the control box 52 will control the application of power to the system so that the power may be initially applied to the tube 24 for "warm up" purposes for a period of time prior to the application of power to the logic circuitry. Such separable application of power is well known and easily achieved by those skilled in the art.

It should be apparent then that the control box 52 may be physically located at a point far remote from the housing 12. A multi wire cable connected to the connector 45 and to the control box 52 may be utilized for not only applying the control signal to the summing point 50 as described hereinabove but also for carrying the power to the motor 36 and the tube 24.

Thus it can be seen that the objects of the invention have been achieved by the apparatus and techniques presented hereinabove. While in accordance with the Patent Statutes only the best mode and preferred embodiment of the invention have been presented and described in detail, it is to be understood that the invention is not limited thereto or thereby. Consequently, for an appreciation of the scope and breadth of the invention reference should be had to the appended claims.

What is claimed is:

1. Apparatus for positioning and maintaining the projection of a collimated light beam, comprising:

a collimated light source for projecting a beam;

first circuit means calibrated for pre-selection by an operator of the angle of projection for the beam with respect to a reference;

second means connected to the light source for producing an output signal indicative of the degree of alignment of the projected beam with said reference; and third means interconnected among the first and second means and the light source for controlling the angle of projection of the beam.

2. The apparatus as recited in claim 1 wherein the light source comprises a laser tube and the second means comprises an inclinometer fixedly connected thereto.

3. The apparatus as recited in claim 1 wherein the third means comprises a summing amplifier, receiving and summing signals from the first and second means.

4. The apparatus as recited in claim 3 wherein the light source is pivotally mounted within a case and wherein the third means further comprises a servo motor in geared connection with one of the ends of the light sources, the servo motor being operatively connected to and receiving the output of the summing amplifier.

5. The apparatus as recited in claim 4 wherein the light source is connected to a rotatable threaded vertical shaft by means of a threaded sleeve, the shaft being in geared connection with the servo motor.

6. The apparatus as recited in claim 1 wherein the first circuit means comprises a potentiometer connected to an operational amplifier, the potentiometer being calibrated and regulating the application of voltage to the operational amplifier according to the angle of projection which is pre-selected.

7. The apparatus as recited in claim 1 wherein the first circuit means comprises a plurality of thumbwheel switches having binary coded decimal outputs and connected through a resistor ladder to an operational amplifier.

8. The apparatus as recited in claim 7 which further includes a potentiometer interconnected between the operational amplifier and the third means for compensating for inaccuracies resulting from the interconnection between the second means and the light source.

9. Apparatus for projecting and maintaining a light beam in a controllable manner, comprising:

a laser tube pivotally mounted within a housing and projecting a beam therefrom;

an inclinometer fixedly connected to the tube and producing an output signal corresponding to the alignment of the tube with the horizon;

first circuit means for producing an electrical signal indicative of a desired angle of projection; and a second circuit means interconnecting the laser tube, inclinometer, and first circuit means for pivotally adjusting the positional relationship of the laser tube with the horizontal, the second circuit means comprising a first summing amplifier receiving the summing the output signal of the inclinometer with the electrical signal of the first circuit means.

10. The apparatus as recited in claim 9 wherein the second circuit means further includes a servo motor operatively connected to the first summing amplifier and being in vertical moving connection with one end of the laser tube.

11. The apparatus according to Claim 10 wherein the laser tube is operatively connected to the servo motor by apparatus, comprising:

a rotatable threaded vertical shaft positioned behind the tube;

a sleeve threaded upon the shaft and having support members extending horizontally therefrom; and, a connecting member having U-shaped recesses therein connected to the tube, the U-shaped recesses receiving and resting upon the horizontally extending support members.

12. The apparatus as recited in claim 9 wherein the first circuit means comprises a potentiometer interposed between two voltage levels and adjustable to supply a voltage to the first summing amplifier corresponding to the angle of projection desired for the laser beam.

13. The apparatus according to claim 9 wherein the first circuit means comprises a plurality of selector switches interposed between a voltage level and a resistor network and operative to apply the voltage level to certain of the resistors of the resistor network in accordance with operator-selected positions of the selector switches.

14. The apparatus according to claim 13 wherein the resistor network is connected to a second summing amplifier, the second summing amplifier supplying a signal to the first summing amplifier indicative of the desired angle of projection.

15. The apparatus as recited in claim 14 wherein a trimming potentiometer interconnects the first and second summing amplifiers, the trimming potentiometer providing compensation means for any inherent errors existing from the connection between the inclinometer and laser tube.

* * * * *